United States Patent [19]
Imbert et al.

[11] 3,872,333
[45] Mar. 18, 1975

[54] GENERATOR FOR PRODUCING RECTILINEAR VIBRATIONS AT A CONTROLLED VELOCITY ESPECIALLY FOR USE IN MOSSBAUER SPECTROMETERY

[75] Inventors: Pierre Imbert, Bures-Sur-Yvette; Jean-François Lericque, Val-D'Albian, both of France

[73] Assignee: Commissariat A L'Energie Atomique, Paris, France

[22] Filed: Feb. 28, 1973

[21] Appl. No.: 336,825

[30] Foreign Application Priority Data
Mar. 8, 1972 France .......................... 72.07977

[52] U.S. Cl. ................................ 310/27, 318/128
[51] Int. Cl. ......................................... H02k 33/12
[58] Field of Search ............. 73/71.5, 71.6; 310/13, 310/27, 15, 25; 318/127–132; 250/515, 398

[56] References Cited
UNITED STATES PATENTS

| | | | |
|---|---|---|---|
| 2,776,560 | 1/1957 | Erath et al. .................... | 310/27 X |
| 3,018,467 | 1/1962 | Harris .............................. | 310/27 X |
| 3,417,268 | 12/1968 | Lace ................................. | 310/27 |
| 3,439,198 | 4/1969 | Lee .................................. | 310/27 X |
| 3,452,259 | 6/1969 | Shtrikman et al. ............... | 310/27 X |
| 3,470,399 | 9/1969 | Johnson et al. .................. | 310/13 |
| 3,484,628 | 12/1969 | Barna ............................... | 310/27 X |
| 3,486,094 | 12/1969 | Zane ................................. | 318/128 |
| 3,599,020 | 8/1971 | Harris et al. ..................... | 310/27 X |

Primary Examiner—D. F. Duggan
Attorney, Agent, or Firm—Flynn & Frishauf

[57] ABSTRACT

The generator is of the type comprising a driving unit formed by a stationary magnet and by a driving electromagnetic coil, a rod rigidly fixed to the coil and a velocity transducer for regulating the vibrations by electronic control and constituted by a magnetized pin. The generator essentially comprises a second rod attached to the other end of the magnetized pin and a second driving unit in which the polarity of the magnet is opposite to that of the first. The second rod and second driving unit are mounted symmetrically with the first with respect to the central transverse section of the magnetized pin.

3 Claims, 5 Drawing Figures

GENERATOR FOR PRODUCING RECTILINEAR VIBRATIONS AT A CONTROLLED VELOCITY ESPECIALLY FOR USE IN MOSSBAUER SPECTROMETERY

This invention relates to a generator for producing rectilinear vibrations at a controlled velocity.

This generator finds an application in techniques involving the use of a generator for producing vibrations which must satisfy well-determined requirements of shape and amplitude for which only a controlled system is considered suitable.

One particularly advantageous application of the generator is in the field of Moessbauer spectrometry either for fundamental research or measurements in the areas of solid-state physics, magnetism and chemistry, but also in molecular biology, nuclear physics, mineralogy and metallurgy. Especially in the field of mineralogy, the Moessbauer effect is frequently employed for analyses of samples.

It is known that Moessbauer spectrometry makes use of γ-radiation sources of a special type having an extremely narrow emission line (energy resolution of the order of $10^{-12}$). Sources of this type are usually available in the form of small metallic discs containing a suitable radioactive isotope.

The experiments consist in observing the absorption of said γ-radiation in certain compounds to be studied which exhibit absorption lines having characteristics which are closely related both in energy and resolution to those of the emission line of the source. In order to obtain the absorption spectrum (or so-called Moessbauer spectrum) of these substances, it is necessary to produce a variation in the energy of γ-radiation and to measure the corresponding variations in absorption; to this end, energy scanning by Doppler effect is carried out, that is to say by means of a sweep of velocity of the γ-radiation emitting source which is displaced in rectilinear motion towards the absorber substance.

In consequence, the apparatus employed in Moessbauer spectrometry essentially comprises:

a. a vibration generator which produces a reciprocating and cyclic rectilinear movement of the source in order to carry out the velocity sweep, b. an electronic control device which ensures accurate adjustment of the shape of the velocity cycle produced by said vibration generator; in the majority of cases, the velocity cycle chosen is of the so-called "symmetrical triangular" type as shown in FIG. 1 in which the time $t$ is plotted as abscissae and the source velocity $v$ is plotted as ordinates; the cycle is obtained by follow-up control on the basis of the indications supplied by a source-velocity transducer, c. a γ-radiation detector and a multichannel counting device in which the cycle of time scanning of the different channels is synchronized with the velocity cycle in order to measure the radiation flux passing through the absorber compound under study as a function of the velocity of the source and therefore of the energy.

The present invention is concerned solely with vibration generators. The vibration generators which produce the best results are of the controlled electromagnetic type comprising a driving coil which moves within an airgap as in a loudspeaker, provision being made for a velocity transducer which proves essential in order to ensure strictly accurate adjustment of the movement by electronic control, this induced-current velocity transducer being either of the moving-coil or moving-magnet type. In the last-mentioned case, the transducer comprises a magnetized pin which moves within a double solenoid having reverse stationary windings and performing the function of detector.

The essential elements of a vibration generator of this type as employed in the prior art and of the moving-magnet transducer type are shown diagrammatically in FIG. 2.

This vibration generator of known type comprises on the one hand a driving electromagnetic coil 1 which moves within the airgap 2 of a magnet 3 and, on the other hand, a velocity transducer constituted by a magnetized pin 4 placed within a stationary double solenoid (5, 6) carried by a stationary armature 7; said stationary armature 7 is located outside the pole-piece 3a and not fitted within said pole-piece. The two coils 5 and 6 of the solenoid are in opposite directions in order that the electromotive forces generated within each coil by one of the poles of the pin 4 should be added to each other.

One end of a rod 8 is rigidly fixed to the driving coil 1 and the other end of said rod is rigidly fixed to the magnetized pin 4, with the result that any translational movement of the coil 1 causes a corresponding translational movement of the pin 4. The apparatus is completed by the rigid support 36 which is fixed on the base 34 and by two elastic suspension elements 35 for the rod 8.

In order to perform Moessbauer spectrometry, the support 29 of a γ-radiation source is attached to said rod 8 and is caused by means of the vibration generator to vibrate in the direction of the absorber substance (not shown).

Moving-magnet vibration generators of the transducer type shown in FIG. 2 have been described in particular by R.L. Cohen et al., in the Review of Scientific Instruments, 34,671 (1963), by J.J. Spijkerman et al. (Technical Reports Series No 50, Applications of the Moessbauer Effect etc . . . p. 53 – Internat. At. En. Agency, Vienna 1966) and by R. Zane in Nuclear Instruments and Methods, 43, 333 (1966), which make use of Hewlett Packard "L V Syn" transducers, series 6 L V, as velocity transducers.

The results which can be expected of a vibration generator employed in Moessbauer spectrometry clearly depend on the nature of the experiments and on the field of utilization; the maximum requirements which can reasonably be formulated in the present state of researches on the Moessbauer effect will be considered below as criteria.

a. Linearity of response of the velocity transducer

This is an essential characteristic since it is the signal delivered by this element which serves as a basic for electronic control of the movement. It is desirable to ensure that any deviations from linearity do not exceed $10^{-3}$ over the entire useful range of travel of the transducer.

b. Maximum velocity and useful range of travel

In the case of a cycle of symmetrical triangular velocity having a frequency $\nu$ and a maximum velocity $\pm V_m$ as shown in FIG. 1, the total travel A of the transducer is given by the relation: $A = V_m/4$.

A vibration generator designed to cover the entire velocity range which is utilizable in Moessbauer spectrometry must be capable of attaining a velocity $V_M$ of the order of 60 cm/sec. By adopting a typical frequency $v = 12.5$ cps. which cannot be substantially increased without any attendant disadvantages when high-quality control is required, the relation given above results in a maximum travel $A = 12$ mm, which can be considered desirable as a useful range of travel of the velocity transducer. It should be noted that a useful range of travel of this high order is sometimes necessary even in the case of much lower velocities $V_M$ when the frequency $v$ must be reduced in order to eliminate certain mechanical resonances which are inherent in special assemblies (cooled moving sources in cryostats, moving absorbers in stationary source experiments and so forth).

c. Qualities of mechanical coupling between driving coil and velocity transducer In order to achieve accurate and satisfactory control, many authors have rightly insisted on the essential importance of ensuring maximum rigidity and minimum length of the mechanical coupling between the driving coil and the sensing element of the velocity transducer (while nevertheless excluding any mutual electromagnetic inducting between the two elements). In fact, the periodic deformations which are related to the longitudinal elasticity of the mechanical coupling rod have the effect of introducing a phase difference between the displacements of said elements in respect of the high-frequency harmonics of the movement. It is also important to ensure that the natural frequency of longitudinal resonance of the moving system is as high as possible (at least several kilocycles) and higher than the cutoff frequency of the electronic control system in order to prevent any danger of sustained parasitic oscillations.

Provided that a few precautions are taken for use in the presence of magnetic fields, the Hewlett Packard velocity transducer known as the "L V Syn transducer, type -6 L V" ensures a linearity and useful range of travel which satisfy the conditions stated in the foregoing.

However, the known vibration generators which make use of this transducer are subject to certain disadvantages which will be described hereinafter with reference mainly to the Cohen model which was mentioned earlier and is shown diagrammatically in FIG. 2.

The principal disadvantages are related to the excessive length of the connecting rod 8 between the driving coil and the magnetized pin 4 of the transducer (shown in FIG. 2). Owing to the dimensions of the magnetic circuit of the coil 1 which is employed as driving element, it is in fact difficult when using this assembly to reduce the length of the coupling rod 8 to less than about 15 centimeters. At high frequencies, the excessive length of the connecting rod 8 has the effect of reducing the quality of the mechanical coupling between the driving coil 1 and the velocity transducer as well as increasing both the weight and overall dimensions (at least 40 cm) of the moving system and reducing its frequency of longitudinal resonance. It is apparent from the foregoing that the results of the electronic control are thereby impaired; the corresponding defects appear in the reading signal delivered by the velocity transducer and are particularly visible at the time of reversal of slope of the signal, when the beginning of a high-frequency mechanical oscillation of the rod 8 is observed. It is in fact for this reason that Cohen et al. (cited earlier) are obliged to "round-off" or limit the corners of the triangular signal of the velocity cycle which they employ for the excitation.

Among the secondary disadvantages arising from the large dimensions of these vibration generators comprising transducers of the moving-magnet type, mention should be made of their overall size which can prove objectionable in some experiments, the increased difficulty involved in centering the moving system (driving coil 1 and rod 8) and the risk of friction arising from the excessive transverse flexibility of the system.

So far as the devices for suspension of the moving system are concerned, those which are described by Cohen et al. (cited earlier) are scarcely compatible with displacements of very large amplitude (greater than 1 centimeter). In addition, the lobes which are formed by said suspension devices and cut from metallic sheets (bronze or phosphorus) all exhibit a series of sharp mechanical resonances and it is not always possible by controlling these latter to remove the parasitic effects on the movement of the source.

The generator in accordance with the invention, which is also of the moving-magnet velocity transducer type and from which a large number of the disadvantages set forth in the foregoing have been removed, in characterized in particular in that it comprises a double symmetrical mechanical excitation of the push-pull type and a velocity transducer which is fitted in the magnetic blocks 3a and 3'a of each of its two drive systems (as shown in FIG. 3).

More precisely, the invention is directed to a generator for producing rectilinear vibrations at a controlled velocity, of the type comprising a driving unit formed by a stationary magnet and by a driving electromagnetic coil, a rod rigidly fixed to said coil and a velocity transducer for regulating the vibrations by electronic control and constituted by a magnetized pin placed within a stationary double solenoid having reverse windings and carried by a stationary body and one end of said pin being attached to said rod. Said generator essentially comprises a second rod attached to the other end of said magnetized pin and a second driving unit in which the polarity of the magnet is opposite to that of the first, said second rod and said second driving unit being mounted symmetrically with the first with respect to the central transverse section of said magnetized pin, and said velocity transducer being fitted within the two driving units.

The vibration generator in accordance with the invention is further distinguished by the fact that it is provided at each end in the case of each of its two driving coil and rod assemblies with a suspension device comprising three spiral arms formed of metallized glass laminate in accordance with the printed circuit technique employed in electronic assemblies, the metallization being employed for the input and the output of electric current which passes through each driving coil.

In its application to Moessbauer spectrometry, the vibration generator according to the invention carries a radiation source at the end of one of the two rods of said generator which are attached to the magnetized pin.

The vibration generator in accordance with the invention employs for its operation an electronic control device for accurate adjustment of the shape of the velocity cycle by means of the velocity transducer, said control device being constituted by a reference signal generator, a differential amplifier, an integrator, a filter and a power amplifier disposed in this order, the arrangement being such that the signal detected by the velocity transducer is compared in said differential amplifier with the reference signal delivered by said reference signal generator and that after amplification, integration and then passing through said filter and said power amplifier, the resultant signal is fed into the two driving electromagnetic coils.

Further properties and advantages of the present invention will be brought out by the following description which is given by way of explanation without any implied limitation and relates to one form of construction of the vibration generator in accordance with the invention, reference being made to the accompanying drawings in which.

Figure 3:
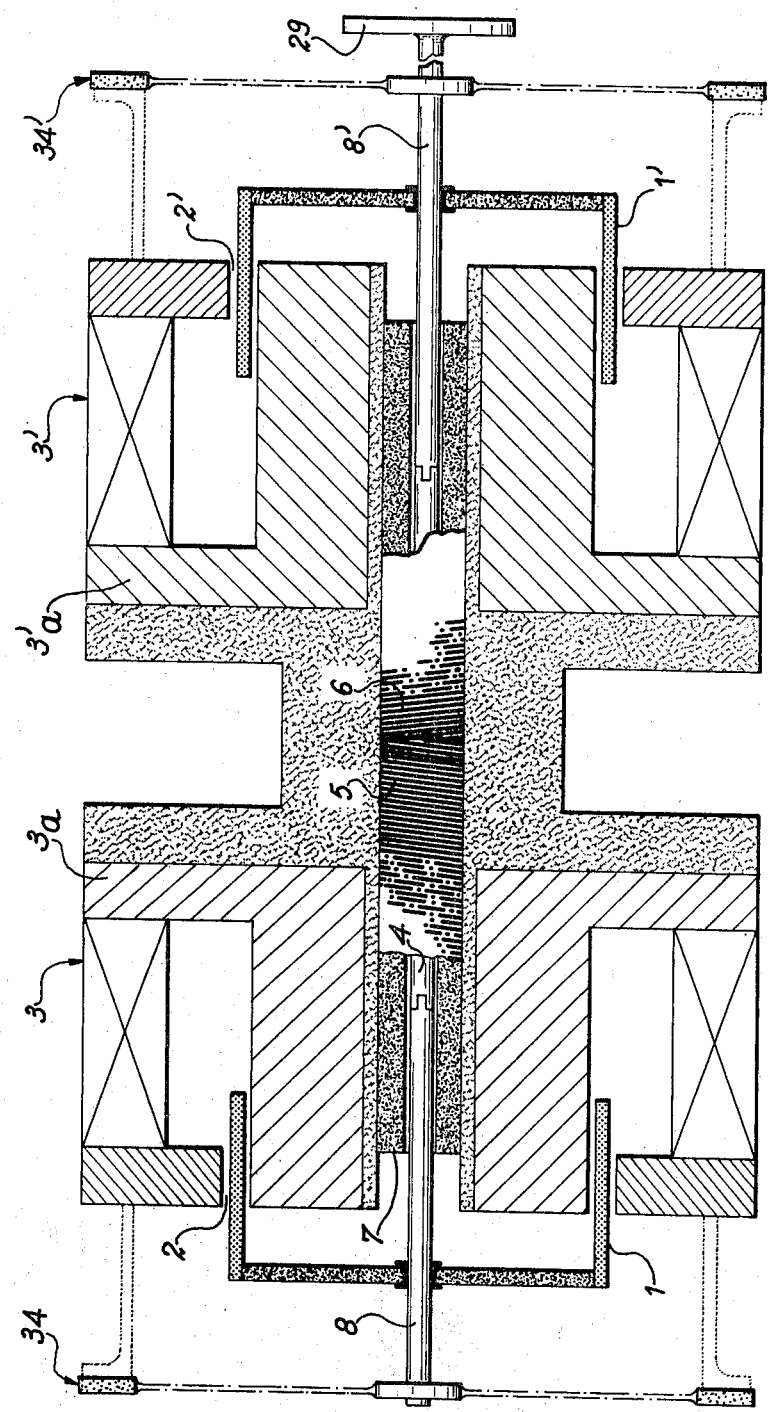
FIG. 3 is a diagrammatic view of the generator in accordance with the invention.

As shown in FIG. 3, the vibration generator in accordance with the invention comprises the following elements which arae disposed symmetrically with respect to the central transverse section of the magnetized pin:

a. Two driving electromagnetic coils 1 and 1' which produce action in the same direction and are each capable of moving within the airgap 2 (and 2' respectively) of a magnet 3 (and 3' respectively).

b. Two rods 8 and 8' which are rigidly fixed respectively to the coils 1 and 1'.

c. A velocity transducer of the moving magnet type constituted by a magnetized pin 4 housed within a stationary double solenoid (5, 6) having reverse windings and carried by a stationary body 7. Each rod 8 and 8' is attached at one end to the magnetized pin 4.

The insertion of the velocity transducer (4, 5, 6, 7) into the pole-pieces 3a and 3'a of the magnetic blocks is characteristic of the invention and makes it possible to divide by a factor of approximately three the length of the connecting rods 8 and 8' which is comprised between the magnetized pin 4 and the point of attachment to the coils 1 and 1' and to achieve a very appreciable reduction in the total dimensions of the apparatus (approximately 30 cm in overall length).

The excitation drive of the push-pull type is based on the use of a driving coil at each end of the assembly and satisfies three types of considerations which consist:

1. in permitting mechanical excitation in phase at the ends of the movable rods 8, 8'. This phase condition eliminates the fundamental frequency of the longitudinal acoustic resonance which appears in a system having one free end.

2. in restoring the symmetry of the magnetic conditions which prevail in the inserted velocity transducer. Although the residual magnetic field produced by each magnet 3, 3' is of low strength at the location of the velocity transducer, tests have shown that this could result in a not-negligible defect of linearity of the order of 1 percent for a useful range of travel of 12 mm in the case of utilization of a single driving unit 1, 3, 3a (case of the prior technique). This defect is reduced to less than 1/1000 by the presence of the second driving unit 1', 3', 3'a which is symmetrical with the unit 1, 3, 3a, provided that the symmetrically corresponding magnetic pole-pieces have opposite polarities as in the case of the magnetized pin of the velocity transducer.

3. in permitting an increase in power without any increase in overall size and, in the event of utilization of the generator in a vacuum (which is sometimes useful in certain experiments), in esnuring better dissipation of the heat released in the drive windings.

Figure 4:
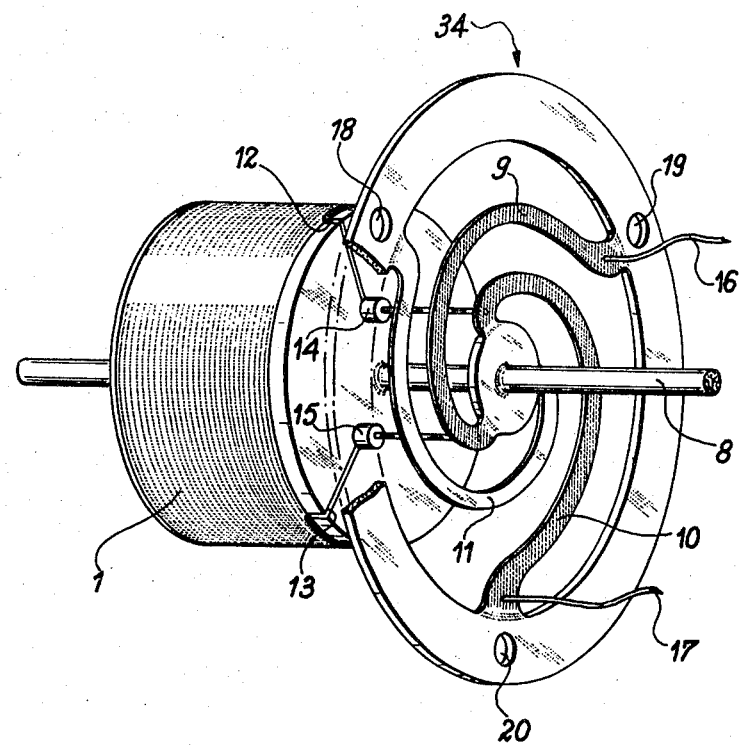
FIG. 4 is a view in perspective showing one of the two suspension devices of the vibration generator in accordance with the invention.

A further improvement made by the invention in the known systems lies in the use of suspensions which are of inherently novel design (as shown in FIG. 4). Provision is made for three spiral arms (9, 10, 11) which are formed of metallized glass laminate in accordance with the printed circuit technique employed in electronic assemblies. The advantages obtained are as follows:

a. From the mechanical standpoint: the spirals 9, 10, 11 of glass laminate ensure a rugged elastic suspension having a substantial range of longitudinal displacement and a high degree of transverse rigidity. The natural mechanical resonances of said spirals are damped in a distinctly more effective manner than those of the metallic suspensions of the prior technique.

b. The problem of flexible electrical connections to the moving coils is solved in a practical, elegant and above all very rugged fashion by metallization with a deposit of copper on two of the three spiral arms. In point of fact, the substantial ranges of displacement employed are such that the usual flexible lead connections frequently give rise to problems of mechanical strength and sometimes produce parasitic resonances. If so desired, metallization of the third spiral arm (11) can serve to connect the movable central rod to ground.

In FIG. 4, which illustrates a suspension device 34, the reference 12 and 13 designate the wires which serve to supply the driving coil 1, the references 14 and 15 designate the terminals which serve to attach said wires to the coil, the references 16 and 17 designate the lead-out portions of the wires which supply the coil 1 and the references 18 to 20 designate the holes for fixing the suspension device on the frame of the apparatus. The rod 8 is rigidly fixed on the one hand to the coil 1 and on the other hand to the central portion of the suspension device.

c. Finally, the technique involved in reproduction and fabrication of printed circuits ensures that the suspensions aforesaid can be readily obtained at low cost.

In conclusion, the vibration generator in accordance with the invention is distinguished by the following features:

a substantial useful range of travel for the displacement (12 mm, for example) which makes it possible to obtain high velocities at moderate frequency (for example 60 cm/sec. at 12.5 cps in the triangular mode):

high linearity of response of the velocity transducer: a precision of $10^{-3}$ over the entire useful range of travel;

characteristics which are adapted to excellent control by virtue of the reduction achieved in the causes of mechanical phase-displacement in the moving system. The practical value $v(t)$ of the source velocity as a function of time differs from its theoretical value (FIG. 1) only by a quantity $\Delta v$ such that $\Delta v/V_M < 10^{-3}$ over 97 percent of the width of the signal. Moreover, the "noise" which is inevitable in the velocity signal is:
- less than 0.01 mm/sec at velocities $V$ such that $0 < V < 10$ cm/sec:
- less than 0.1 mm/sec at the maximum velocity $V_M = 60$ cm/sec;
- high available power within a very small volume with the possibility of utilization under vacuum;
- high strength and rugged construction of the suspensions and movable electrical connections.

Figure 5:
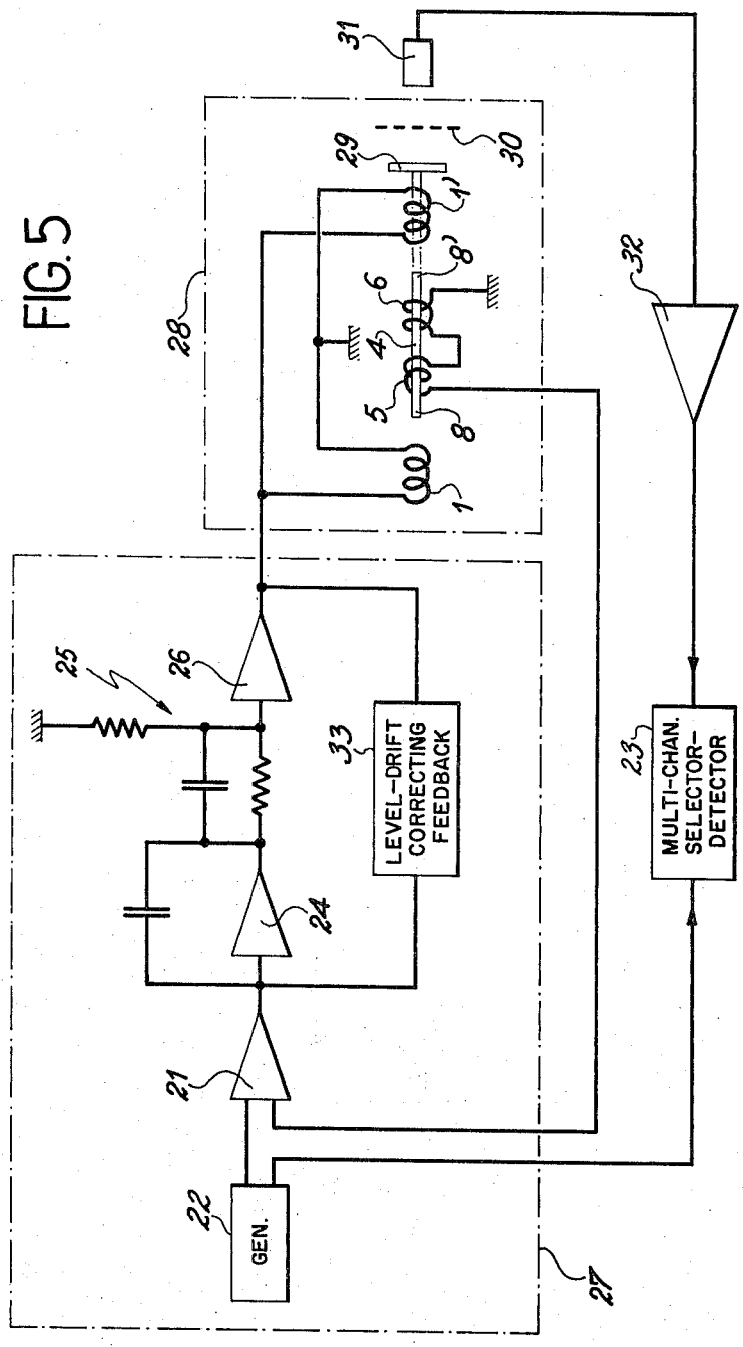
FIG. 5 is a general arrangement diagram of the assembly which is constituted by the driving coils, the transducer and the electronic control device of said generator.

The general arrangement diagram of FIG. 5 serves to gain a clear understanding of the manner in which the rectilinear vibration generator in accordance with the invention is carried into practical effect and shows in particular the detail of the electronic control circuit arrangement which permits the performance of the desired velocity cycle.

The chain-dotted outline 27 in FIG. 5 delimits the complete electronic control device and the chain-dotted outline 28 delimits the complete vibration generator proper including its driving magnetic blocks and its transducer. The different devices which are contained within the outline 28 and have already been set forth in the foregoing description are designated by reference numerals which are identical with those of FIG. 3.

Figure 1:
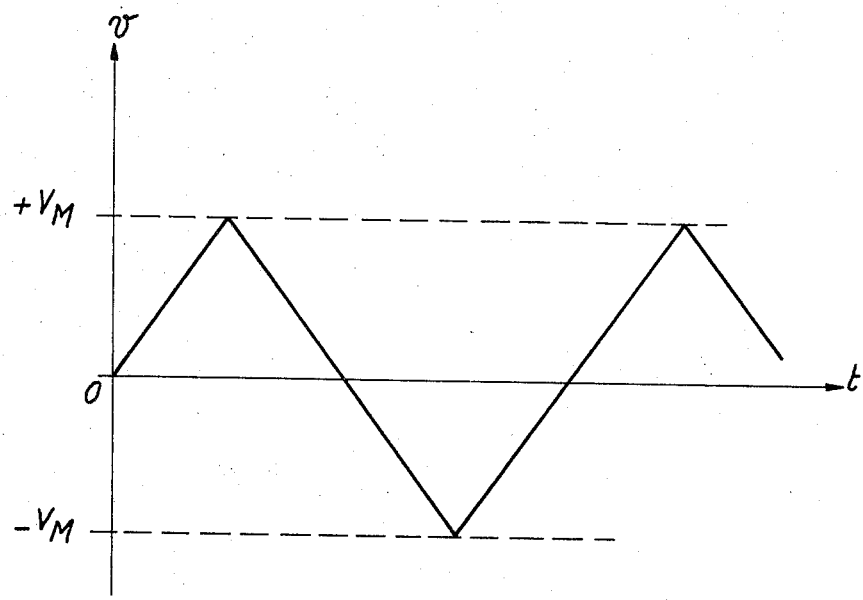
FIG. 1 represents the function $v(t)$ of a velocity cycle of the "symmetrical triangular" type known per se.
Figure 2:
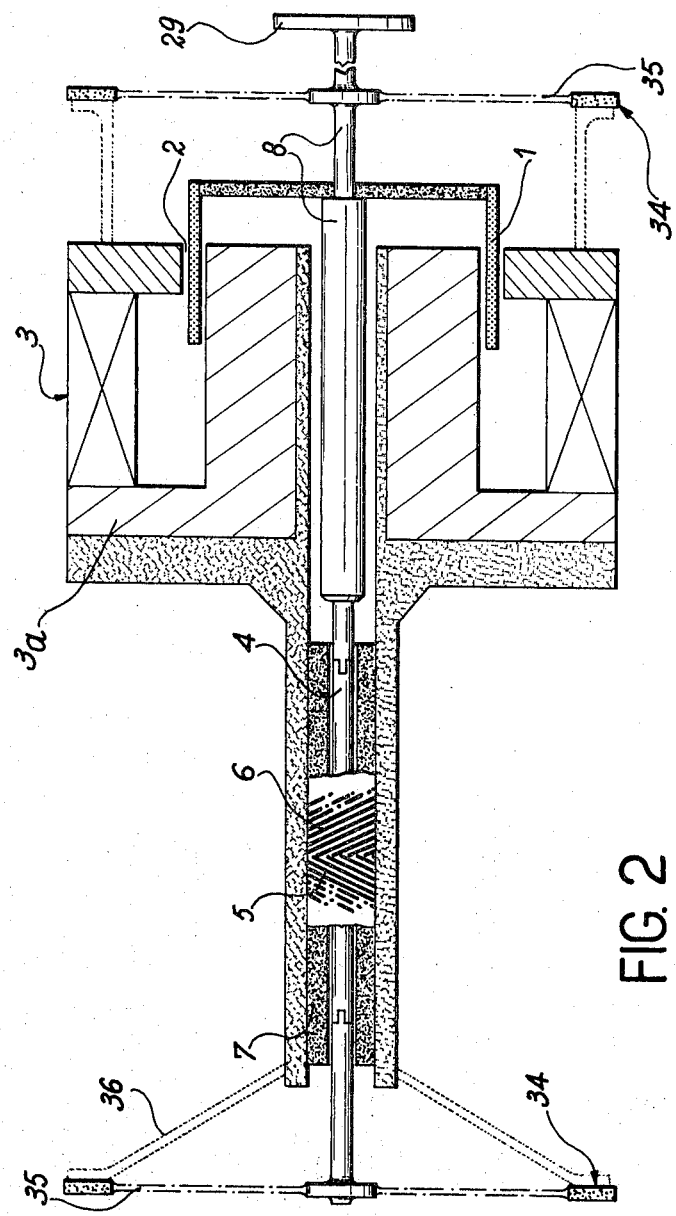
FIG. 2 shows diagrammatically (as mentioned earlier) a vibration generator of the prior art and of the type comprising a moving-magnet transducer.

A generator 22 produces the signals corresponding to the desired velocity cycle, for example of the symmetrical triangular type as shown in FIG. 1. These signals pass into a differential amplifier 21 in which they are compared with the signal detected by the velocity transducer comprising the magnetized pin 4 and the two pickup coils 5 and 6 which surround the rod 8. The differential amplifier 21 then delivers an error signal which, in the particular type of control shown in FIG. 5, in turn generates the drive signal delivered to the coils 1 and 1' which are supplied in parallel. Provision is made at the output of the differential amplifier 21 for an integrator 24 which, on the one hand, integrates the signal and on the other hand attenuates the high-frequency components of said signal. A filter 25 then corrects the phases of certain frequency components of the error signal prior to amplification of this latter in the power amplifier 26 which then directly supplies the two coils 1 and 1' in parallel. A selective negative feedback circuit 33 is employed for the purpose of correcting slow drift in the level of the drive signal which the integrator 24 would tend to produce.

Recording and storage of the results obtained during a measurement cycle are carried out by the multichannel selector 23 which receives on the one hand via the amplifier 32 the signals delivered by the Moessbauer-effect γ-ray detector 31 (and derived from the source located on the source-holder 29 via the absorber 30) and, on the other hand, the signals delivered by the generator 22 which serve to synchronize the results obtained as a function of the point of the cycle under consideration or, in other words, to classify the different pulses obtained in the channel of the spectrum to which they belong.

What we claim is:

1. A generator for producing rectilinear vibrations at a controlled velocity, of the type comprising a driving unit formed by a stationary permanent magnet and by a driving electromagnetic coil which moves within the airgap of said magnet, a rod rigidly fixed to said coil and a transducer for detecting the velocity of said rod and regulating the vibrations by electronic control, said transducer being constituted by a magnetized pin placed within a stationary double solenoid having reverse windings and carried by a stationary body and one end of said pin being attached to said rod, wherein said generator essentially comprises a second rod attached to the other end of said magnetized pin and a second driving unit in which the polarity of the magnet is opposite to that of the first in order to permit push-pull operation therewith, said second rod and said second driving unit being mounted symmetrically with the first with respect to the central transverse section of said magnetized pin and said velocity transducer being fitted within said two driving units.

2. A rectilinear vibration generator in accordance with claim 1, wherein said generator is provided at each end in the case of each of its two driving coil and rod assemblies with a suspension device comprising at least two spiral arms formed of metallized glass laminate in accordance with the printed circuit technique employed in electronic assemblies, the metallization being employed for the input and the output of electric current which passes through each driving coil.

3. A rectilinear vibration generator in accordance with claim 1 wherein, for application to Moessbauer spectrometry, said generator carries a γ-radiation source at the end of one of the two rods of said generator which are attached to said magnetized pin.

* * * * *